United States Patent
He et al.

(10) Patent No.: US 11,843,452 B2
(45) Date of Patent: Dec. 12, 2023

(54) CLOCK SYNCHRONIZATION METHOD AND APPARATUS

(71) Applicant: Huawei Technologies Co., Ltd., Shenzhen (CN)

(72) Inventors: Xiang He, Beijing (CN); Yunlei Qi, Dongguan (CN); Jingfeng Chen, Dongguan (CN); Tao Lin, Shenzhen (CN); Junmin Song, Dongguan (CN); Xinyuan Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/146,634

(22) Filed: Dec. 27, 2022

(65) Prior Publication Data
US 2023/0138058 A1 May 4, 2023

Related U.S. Application Data

(63) Continuation of application No. 17/403,131, filed on Aug. 16, 2021, now Pat. No. 11,552,721, which is a (Continued)

(51) Int. Cl.
*H04J 3/06* (2006.01)
(52) U.S. Cl.
CPC .................. *H04J 3/0661* (2013.01)
(58) Field of Classification Search
None
See application file for complete search history.

(56) References Cited

U.S. PATENT DOCUMENTS

| 9,167,058 B2 | 10/2015 | Gresham et al. |
| 9,396,146 B1 | 7/2016 | Stuardja et al. |

(Continued)

FOREIGN PATENT DOCUMENTS

| CN | 101771528 A | 7/2010 |
| CN | 104426631 A | 3/2015 |

(Continued)

OTHER PUBLICATIONS

"Corrigendum 1: Multi-lane Timestamping," IEEE p. 802.3, 2015, 16 pages.

(Continued)

*Primary Examiner* — Otis L Thompson, Jr.
(74) *Attorney, Agent, or Firm* — Conley Rose, P.C.

(57) ABSTRACT

A clock synchronization method includes receiving, by a receiving apparatus, a plurality of data blocks using a plurality of physical layer modules (PHYs), where the plurality of data blocks include a plurality of head data blocks, performing, by the receiving apparatus, timestamp sampling on the plurality of data blocks to generate a plurality of receipt timestamps, aligning, by the receiving apparatus, the plurality of receipt timestamps using a first receipt timestamp as a reference, generating, by the receiving apparatus, a clock synchronization packet based on the plurality of data blocks, and writing, by the receiving apparatus, a value of a second receipt timestamp into the clock synchronization packet, where the second receipt timestamp is a receipt timestamp that is of a second data block and that is determined based on the plurality of aligned receipt timestamps.

20 Claims, 7 Drawing Sheets

Related U.S. Application Data continuation of application No. 16/860,688, filed on Apr. 28, 2020, now Pat. No. 11,108,485, which is a continuation of application No. PCT/CN2017/108417, filed on Oct. 30, 2017.

(56) References Cited

U.S. PATENT DOCUMENTS

| | | | |
|---|---|---|---|
| 9,407,733 B1* | 8/2016 | Mizrahi | H04J 3/0697 |
| 9,693,325 B1 | 6/2017 | Park et al. | |
| 10,097,339 B1* | 10/2018 | Pogue | H04J 3/0667 |
| 10,284,414 B2* | 5/2019 | Chaloupka | H04L 27/3854 |
| 10,298,344 B1* | 5/2019 | Devineni | H04J 3/0697 |
| 11,646,886 B2* | 5/2023 | Schooler | H04L 67/12 |
| | | | 713/168 |
| 2010/0034191 A1 | 2/2010 | Schulz | |
| 2010/0098111 A1* | 4/2010 | Sun | H03L 7/0807 |
| | | | 370/509 |
| 2011/0110358 A1* | 5/2011 | Haartsen | H04N 21/4305 |
| | | | 370/350 |
| 2011/0158120 A1* | 6/2011 | Hamasaki | H04J 3/0688 |
| | | | 370/252 |
| 2011/0164625 A1 | 7/2011 | Fourcand | |
| 2012/0300795 A1* | 11/2012 | Joergensen | H04J 3/0697 |
| | | | 370/503 |
| 2013/0301635 A1 | 11/2013 | Hollabaugh et al. | |
| 2014/0064303 A1* | 3/2014 | Aweya | H04J 3/0667 |
| | | | 370/509 |
| 2015/0340009 A1 | 9/2015 | Loeffler et al. | |
| 2016/0119075 A1 | 4/2016 | Gareau et al. | |
| 2016/0191277 A1 | 6/2016 | Li et al. | |
| 2017/0005742 A1 | 1/2017 | Gareau et al. | |
| 2017/0005901 A1 | 1/2017 | Gareau | |
| 2017/0005949 A1 | 1/2017 | Gareau | |
| 2017/0006360 A1 | 1/2017 | Gareau | |
| 2017/0093757 A1 | 3/2017 | Gareau et al. | |
| 2017/0171163 A1 | 6/2017 | Gareau et al. | |
| 2017/0201318 A1 | 7/2017 | Yazar et al. | |
| 2017/0272308 A1 | 9/2017 | Stone et al. | |
| 2017/0324538 A1* | 11/2017 | Effenberger | H04L 7/0075 |
| 2018/0076932 A1 | 3/2018 | Okada | |
| 2018/0159785 A1 | 6/2018 | Wu et al. | |
| 2018/0183538 A1 | 6/2018 | Chen et al. | |
| 2018/0191802 A1* | 7/2018 | Yang | H04L 1/0018 |
| 2018/0196393 A1 | 7/2018 | Oda et al. | |
| 2018/0227080 A1* | 8/2018 | Stein | H04N 21/4305 |
| 2019/0020465 A1* | 1/2019 | Carlstedt | H04L 43/106 |
| 2019/0173856 A1 | 6/2019 | Gareau et al. | |
| 2020/0007255 A1 | 1/2020 | Gareau et al. | |
| 2020/0021378 A1 | 1/2020 | Aweya | |
| 2020/0236517 A1 | 7/2020 | Matsunaga et al. | |
| 2020/0259578 A1 | 8/2020 | He et al. | |
| 2023/0040424 A1* | 2/2023 | Gopinathanasari | G06F 3/044 |
| 2023/0147706 A1* | 5/2023 | Griffin | H04L 69/28 |
| | | | 345/1.3 |

FOREIGN PATENT DOCUMENTS

| | | |
|---|---|---|
| CN | 106411454 A | 2/2017 |
| CN | 106612203 A | 5/2017 |
| CN | 106788855 A | 5/2017 |
| CN | 106850465 A | 6/2017 |
| EP | 3113502 A1 | 1/2017 |
| WO | 03076333 A2 | 9/2003 |

OTHER PUBLICATIONS

IEEE Std 1588, "IEEE Standard for a Precision Clock Synchronization Protocol for Networked Measurement and Control Systems, IEEE Instrumentation and Measurement Society," Jul. 24, 2008, 289 pages.

"Series G: Transmission Systems and Media, Digital Systems and Networks, Packet over Transport aspects—Synchronization, quality and availability targets, Series Y: Global Information Infrastructure, Internet Protocol Aspects, Next-Generation Neworks, Internet of Things and Smart Cities, Internet protocol aspects—Transport, Distribution of timing information through packet networks," ITU-T, G.8264/Y.1364, Aug. 2017, 42 pages.

Sheu, J., et al, "Realization of an Ethernet-based synchronous audio playback system," Multimedia Tools and Applications, vol. 75, Issue 16 , Aug. 2016, 22 pages.

Zijian He et al, "Using flexible Ethernet to build a flexible network," 16th International Conference on Advanced Communication Technology, Feb. 16-19, 2014, 4 pages.

IEEE Std 1588-2019, IEEE Standard for a Precision Clock Synchronization Protocol for Networked Measurement and Control Systems, IEEE Instrumentation and Measurement Society, 499 pages.

Xinyuan Wang, et al, Further Requirement of FlexE in Mobile Transport Application Contribution No. oif2016.255.00, Working Group: PLL, Title: Further Requirement of FlexE in Mobile Transport Application, Aug. 9, 2016, 11 pages.

Steve Trowbridge, FlexE 2.0 Support of Frequency and Time by FlexE Groups, oif2016.491.00, Dec. 2016, 4 pages.

Synchronization of FlexE, OIF2017.025.00, Jan. 2017, 16 pages.

Xinyuan Wang, et al., Technical Proposal for Time Synchronization over FlexE, Contribution No. oif2017.142.00, Working Group: PLL, Apr. 18, 2017, 10 pages.

Qiwen Zhong, et al, oif2017.164.00 Working Group: PLL (Protocol); Transport of frequency and time by the FlexE group, May 2017, 19 pages.

PTP over FlexE Consideration, OIF2017.365.00, Aug. 2017, 15 pages.

FlexE Multiframe Boundary as PTP Timestamp Reference Instance in FlexE2.0, OIF2017.379.00, Aug. 2017, 13 pages.

Xiang He, et al, Comments on oif2017.256.00—Regarding Time Synchronization, Contribution No. oif2017.380.01, Working Group: PLL (Protocol); Aug. 1, 2017, 13 pages.

PTP Message Timestamp Point Options in FlexE2.0, OIF2017.404.00, Aug. 2017, 6 pages.

* cited by examiner

CLOCK SYNCHRONIZATION METHOD AND APPARATUS

CROSS-REFERENCE TO RELATED APPLICATIONS

This is a continuation of U.S. patent application Ser. No. 17/403,131 filed on Aug. 16, 2021, which is a continuation of U.S. patent application Ser. No. 16/860,688 filed on Apr. 28, 2020, now U.S. Pat. No. 11,108,485, which is a continuation of International Patent Application No. PCT/CN2017/108417 filed on Oct. 30, 2017. All of the aforementioned patent applications are hereby incorporated by reference in their entireties.

TECHNICAL FIELD

This application relates to the communications field, and in particular, to a clock synchronization method and apparatus.

BACKGROUND

A flexible Ethernet (FlexE) is an Ethernet developed based on a legacy Ethernet. A variable rate interface between a router and an Optical Transport Network (OTN) is defined in the FlexE, mainly to simplify mapping and transmission manners of an Ethernet interface in the OTN as far as possible. A higher transmission rate and a higher transmission bandwidth can be implemented in the FlexE based on a rate binding technology and a flexible mapping manner between an Ethernet interface and an OTN.

In the FlexE, a packet is divided into a plurality of data packets in a transmission process, and the plurality of data packets are transmitted using different physical layer modules (PHYs). After receiving the plurality of data packets, a receiving apparatus needs to restore the Ethernet packet from the plurality of data packets based on an overhead frame. In a sending process, a plurality of data blocks are mapped from a FlexE client to a PHY. Because there are a plurality of PHYs in the FlexE, a plurality of data blocks from a same FlexE client may be mapped to any one or more PHYs. In addition, because a mapping relationship may change in a transmission process, data blocks of a same FlexE client may appear in different PHYs at different moments. Consequently, a skew occurs between the plurality of data blocks from the same FlexE client after the plurality of data blocks arrive at the receiving apparatus, and a skew amount cannot be estimated, leading to a result that the receiving apparatus cannot accurately determine a receiving time of a clock synchronization packet.

SUMMARY

This application provides a clock synchronization method and apparatus. Timestamp sampling is performed on received data blocks to generate a plurality of receipt timestamps, and the plurality of receipt timestamps are aligned such that a skew that occurs between a plurality of data blocks from a same FlexE client after the plurality of data blocks arrive at a receiving apparatus can be corrected, to accurately determine a receiving time of a clock synchronization packet.

According to a first aspect, a clock synchronization method is provided, including receiving, by a receiving apparatus, a plurality of data blocks using a plurality of PHYs, where the plurality of data blocks include a plurality of head data blocks, the head data block is a data block that is the first to arrive at the receiving apparatus in data blocks transmitted in a PHY, and the plurality of head data blocks are in a one-to-one correspondence with the plurality of PHYs, performing, by the receiving apparatus, timestamp sampling on the plurality of data blocks to generate a plurality of receipt timestamps, aligning, by the receiving apparatus, the plurality of receipt timestamps using a first receipt timestamp as a reference, where the first receipt timestamp is a receipt timestamp corresponding to a first data block in the plurality of receipt timestamps, the first data block is a data block transmitted using a first PHY, and the first PHY is a PHY corresponding to a head data block that is the last to arrive at the receiving apparatus in the plurality of head data blocks, generating, by the receiving apparatus, a clock synchronization packet based on the plurality of data blocks, and writing, by the receiving apparatus, a value of a second receipt timestamp into the clock synchronization packet, where the second receipt timestamp is a receipt timestamp that is of a second data block and that is determined based on the plurality of aligned receipt timestamps, the second data block is a data block for sending timestamp sampling in the plurality of data blocks, and a sending timestamp of the second data block is a sending timestamp of the clock synchronization packet.

According to the technical solution provided in this embodiment, the receiving apparatus continuously and periodically time-stamps (that is, performs timestamp sampling on) data blocks received by each PHY, to generate a plurality of receipt timestamps, where the plurality of receipt timestamps include a timestamp corresponding to a data block (that is, the second data block) for sending timestamp sampling in the plurality of data blocks, and aligns the timestamps. In an embodiment, the receiving apparatus waits for a PHY (that is, the first PHY) that is the last to receive an overhead block (OH) in the plurality of PHYs, and adjusts, using a timestamp (that is, a first timestamp) of a data block that is the first to be received by the first PHY after the first PHY receives the overhead block as a reference, timestamps of data blocks received by the other PHY in the plurality of PHYs, and uses the first timestamp as a common timestamp of data blocks that are the first to be received by all PHYs after the PHYs receive overhead blocks in order to align times at which the plurality of data blocks arrive at the receiving apparatus. The plurality of data blocks include the data blocks corresponding to the clock synchronization packet. After the clock synchronization packet is restored, the receipt timestamp corresponding to the second data block can be determined. The timestamp corrects a skew that occurs between a plurality of data blocks from a same FlexE client after the plurality of data blocks arrive at the receiving apparatus.

Optionally, the aligning, by the receiving apparatus, the plurality of receipt timestamps using a first receipt timestamp as a reference includes adjusting, by the receiving apparatus, values of the plurality of receipt timestamps in duration of a receiving period using the first receipt timestamp as a reference.

Optionally, the duration of the receiving period is equal to duration needed by the receiving apparatus to receive X-bit data, and X is a value of a data bus bit width of the receiving apparatus or a smaller value in values of data buffer bit widths of a serial-to-parallel conversion port of the receiving apparatus.

A smaller bit width indicates a shorter receiving period, a higher receipt timestamp sampling frequency, and a smaller time granularity of adjusting the plurality of timestamps, to help improve precision of the finally determined receipt timestamp of the clock synchronization packet.

Optionally, before the generating, by the receiving apparatus, a clock synchronization packet based on the plurality of data blocks, the method further includes deleting, by the receiving apparatus, a receipt timestamp other than the receipt timestamp corresponding to the first PHY.

The receipt timestamps of the PHYs are the same after alignment processing. Therefore, a receipt timestamp of only one PHY may be retained, to reduce occupation of storage space.

Optionally, the second data block is a data block corresponding to a start of frame delimiter (SFD) in the clock synchronization packet.

The SFD is a field that is the first to be sent and the first to be received in the clock synchronization packet, and in a legacy Ethernet, timestamp sampling is performed using the SFD as a reference point. Therefore, compatibility of the clock synchronization method in the FlexE can be improved using a bit that is the first to be received in the receiving period as a timestamp sampling point.

Optionally, the clock synchronization packet is carried in a client payload of the FlexE.

In the method provided in this embodiment, the clock synchronization packet is received using the client payload of the FlexE, and this is the same as a clock synchronization packet receiving method in the legacy Ethernet such that compatibility of the clock synchronization method in the FlexE can be improved. In addition, in a FlexE-FlexE direction connection scenario, a sending timestamp is directly transmitted to a FlexE demultiplexer (demux). Compared with a method for sending a timestamp using an overhead frame in other approaches, in this embodiment, a sending apparatus does not need to extract a sending timestamp from a client payload and add the sending timestamp to an overhead frame, and the receiving apparatus does not need to extract the sending timestamp from the overhead frame and add the sending timestamp to the client payload, to reduce logic complexity.

According to a second aspect, a clock synchronization apparatus is provided. The apparatus may implement functions executed by the receiving apparatus in the method in the first aspect. The functions may be implemented using hardware, or may be implemented by hardware executing corresponding software. The hardware or software includes one or more units or modules corresponding to the foregoing functions.

In a possible design, a structure of the apparatus includes a processor and a communications interface. The processor is configured to support the apparatus in executing a corresponding function in the method in the first aspect. The communications interface is configured to support internal communication of the apparatus and communication between the apparatus and another apparatus. The apparatus may further include a memory. The memory is configured to be coupled to the processor, and store a program instruction and data that are necessary for the apparatus.

According to a third aspect, a computer readable storage medium is provided. The computer readable storage medium stores computer program code. When the computer program code is executed by a processing unit or a processor, a receiving apparatus is enabled to perform the method in the first aspect.

According to a fourth aspect, a chip is provided, where the chip stores an instruction, and when the instruction is run on a receiving apparatus, the chip is enabled to perform the method in the first aspect.

According to a fifth aspect, a computer program product is provided, where the computer program product includes computer program code, and when the computer program code is run by a communications unit or a communications interface and a processing unit or a processor of a receiving apparatus, a sending apparatus is enabled to perform the method in the first aspect.

DESCRIPTION OF EMBODIMENTS

The following describes the technical solutions of this application with reference to the accompanying drawings.

In a legacy Ethernet, after passing through a switching board, a service flow is usually sequentially processed by modules or devices such as a traffic management (TM) module, a network process unit (NPU), a medium access control (MAC) layer module, and a (PHY.

The TM module performs quality of service (QoS) processing on the service flow based on an available bandwidth of a network and a priority of the service flow. For example, if the available bandwidth of the network is insufficient to transmit all service flows, the TM module may transmit a high-priority service flow and discard a low-priority service flow.

NP is a chip processing an Ethernet service, and is configured to process an Ethernet frame. Ethernet frame processing includes Ethernet frame parsing and route searching.

The MAC layer module is mainly responsible for connecting and controlling physical media at a physical layer. For a service packet in the Ethernet, physical layer information may be encapsulated and decapsulated at this layer.

The PHY may be defined as providing mechanical, electronic, functional, and normative attributes for physical link setup, maintenance, or teardown needed by data transmission. The PHY mentioned in this specification may include physical layer working devices at a transmit end and a receive end, and a fiber between the transmit end and the receive end. The physical layer working devices may include, for example, a physical layer interface device of the Ethernet.

Figure 1:
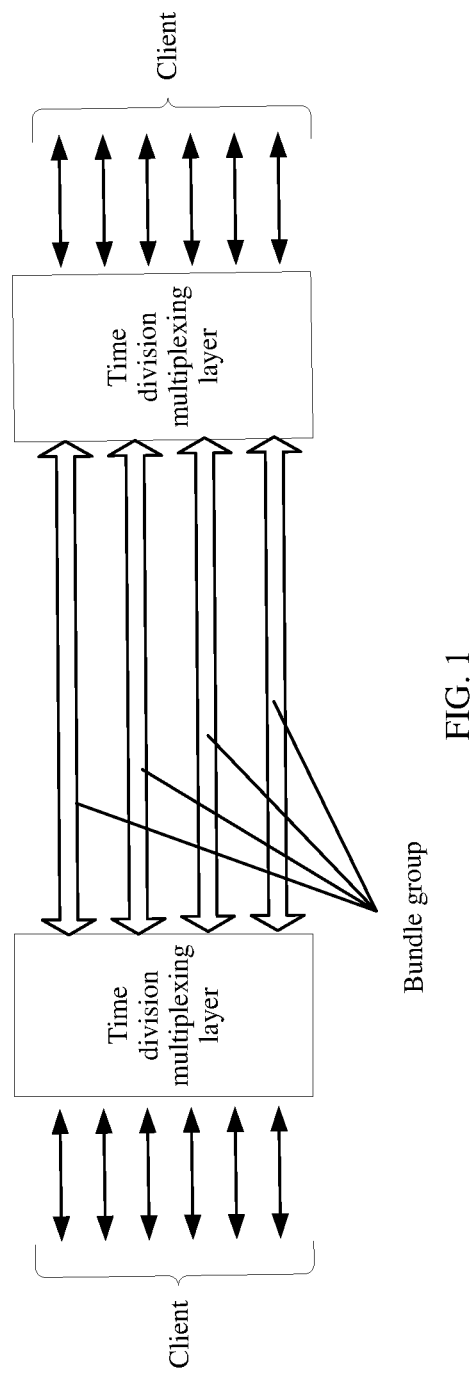
FIG. 1 is a schematic diagram of a general architecture of a FlexE.

Referring to FIG. 1, based on the legacy Ethernet, new concepts such as a bundle group, a FlexE client, a calendar, and a FlexE time division multiplexing (TDM) layer (FlexE shim) are introduced to a FlexE.

Bundle group. The bundle group may include a plurality of PHYs. For example, the bundle group may include 1 to 256 PHYs that support a 100-gigabit Ethernet (GE) rate.

Client. The client may be considered as an Ethernet flow based on a physical address. Clients that perform sending using a same bundle group need to share a same clock, and these clients need to perform adaptation based on allocated slot rates. Bandwidth overheads of each client may be adapted by inserting/deleting an idle block.

Slot. A bandwidth resource of one PHY is usually divided into a plurality of slots (for example, 20 slots). During actual use, service data is first encapsulated in a slot, and then the slot is mapped to a PHY in the bundle group. A mapping relationship between the slot and the PHY is recorded in the calendar of the FlexE. The FlexE usually supports two calendars. One calendar is a calendar that is currently in use, and the other calendar may be used as a standby calendar. The two calendars may be switched to each other, and a specific switching time may be negotiated between a FlexE multiplexer (mux) and a FlexE demux and switching is performed synchronously. In this way, when a service configuration of a client changes, a service of another client is not affected.

TDM layer. The TDM layer is mainly used to slice service data based on a same clock, encapsulate sliced service data in pre-divided slots, and then map, based on a preconfigured calendar (which may be further configured by a user), the divided slots to PHYs in the bundle group for transmission. Each slot is mapped to one PHY in the bundle group.

As a TDM based technology, in the FlexE, all Ethernet packets are divided into 64 bit (B)/66 B data blocks, and these data blocks are mapped to a plurality of different PHYs based on slots. A 100 GE PHY is used as an example. Each 100 GE PHY corresponds to 20 64 B/66 B code blocks, and each code block corresponds to a payload rate of 5 gigabits per second (Gbps). In the new network architecture, a time sequence in which the data blocks arrive at a receiving apparatus changes. However, a premise of applying a clock synchronization technology in the legacy Ethernet is that a time sequence in which data blocks arrive at a receiving apparatus does not change. Consequently, it is very difficult to apply the clock synchronization technology in the legacy Ethernet to the FlexE. The difficulty is subsequently specifically analyzed in this specification.

For ease of understanding of the technical solutions of this application, the following describes some technical features in this application.

Figure 2:
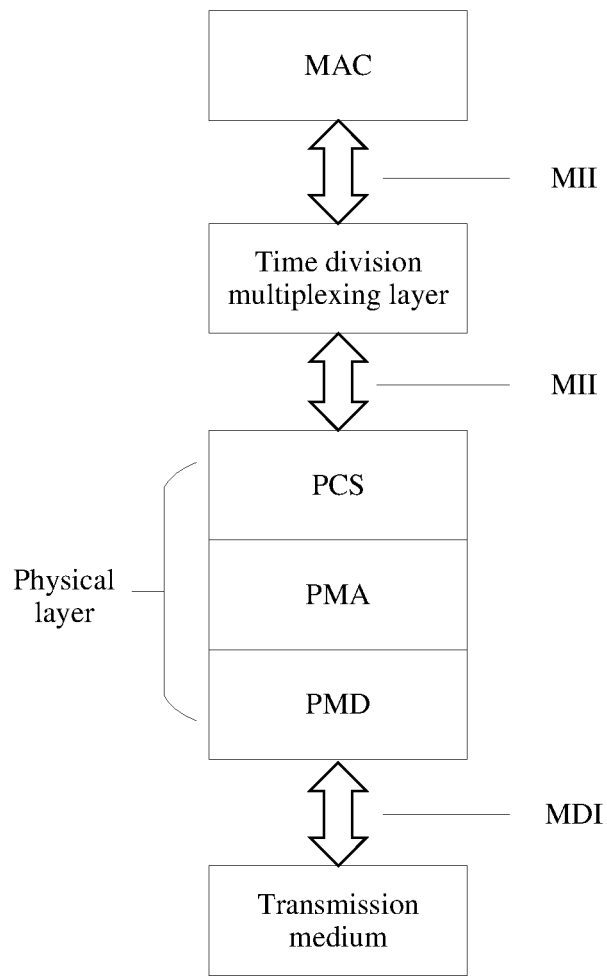
FIG. 2 is a schematic diagram of a partial architecture of a FlexE applicable to this application.

FIG. 2 is a schematic diagram of a partial architecture of a FlexE applicable to this application.

As shown in FIG. 2, the partial architecture of the FlexE includes a MAC sublayer, a TDM layer, and a physical layer, where the MAC sublayer is a sublayer of a data link layer and is connected to a logical link control sublayer in the upstream. The physical layer may be further divided into a Physical Coding Sublayer (PCS), a Physical Medium Attachment (PMA) sublayer, and a Physical Medium Dependent (PMD) sublayer. The MAC sublayer is connected to the TDM layer using a medium independent interface (MII), and the TDM layer is connected to the physical layer using a medium dependent interface (MDI). The physical layer is connected to a transmission medium in the downstream, and the physical layer is connected to the transmission medium using a MDI. Functions of the foregoing layers and interfaces are implemented by corresponding chips or modules. For example, functions corresponding to the PCS, the PMA sublayer, and the PMD sublayer may be separately implemented by different PHYs.

A MAC address of data that passes through a same MAC module is the same. Therefore, the MAC module is a FlexE client. In a signal sending process, the PCS is configured to perform operations, for example, encoding, scrambling (scrambled), inserting an overhead, and inserting an alignment marker (AM), on the data. In a signal receiving process, the PCS performs reverse processing processes of the foregoing steps. Signals may be sent and received by different function modules of the PCS.

Main functions of the PMA sublayer are link monitoring, carrier monitoring, coding and decoding, sending clock synthesis, and receiving clock recovery. Main functions of the PMD sublayer are scrambling/descrambling and coding/decoding a data stream, and performing direct current restoration and adaptive equalization on a received signal.

It should be understood that the foregoing architecture is merely an example description, and an architecture of the FlexE applicable to this application is not limited thereto. For example, there may be a Reconciliation Sublayer (RS) between the MAC sublayer and the TDM layer, to provide a signal mapping mechanism between the MII and the MAC sublayer, and there may be a forward error correction (FEC) sublayer between the PCS and the PMA sublayer, to improve reliability of sent data.

Figure 3:
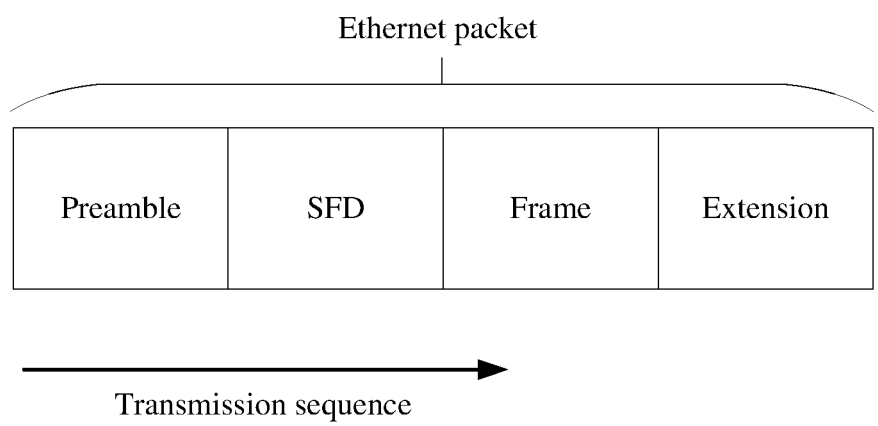
FIG. 3 is a schematic diagram of a data packet format of an Ethernet packet.

FIG. 3 shows a structure of an Ethernet packet and a location of a SFD in the Ethernet packet. One Ethernet packet includes seven octet preambles (preamble), one octet SFD, and a variable length frame. The SFD and the preambles are usually located in a 66 B data block. A sending sequence of the Ethernet packet is a sequence from left to right in FIG. 3, that is, the preambles are first sent, then the SFD is sent, and finally the frame is sent. Because in an actual sending process, a least significant bit (LSB) is sent first, and then a most significant bit (MSB) is sent, in the actual sending process, the SFD is a part that is the first to be sent in the entire Ethernet packet.

In a clock synchronization process of a legacy Ethernet, a sending apparatus uses a moment at which a data block corresponding to the SFD arrives at the MDI after passing through the PMA sublayer as a sending timestamp of a clock synchronization packet. Because transmission is performed using a single PHY in the legacy Ethernet, and there is no TDM layer shown in FIG. 2 in the legacy Ethernet, a time sequence in which data blocks arrive at a receiving apparatus does not change, and an MDI of the sending apparatus may identify a data block corresponding to the clock synchronization packet and time-stamp the data block. The receiving apparatus may identify a data block corresponding to an SFD of the clock synchronization packet, and record the SFD of the clock synchronization packet.

As shown in FIG. 1, in the FlexE, data is transmitted using a plurality of PHYs, and in the FlexE, data blocks are mapped to different PHYs using the TDM layer shown in FIG. 2 such that a sequence of the data blocks is disrupted. If a clock synchronization method in the legacy Ethernet is used, timestamp sampling modules of the sending apparatus and the receiving apparatus cannot determine an SFD of a clock synchronization packet, and as a result, clock synchronization cannot be performed.

The following describes in detail a difficulty of applying a clock synchronization technology in the legacy Ethernet to the FlexE.

Figure 4:
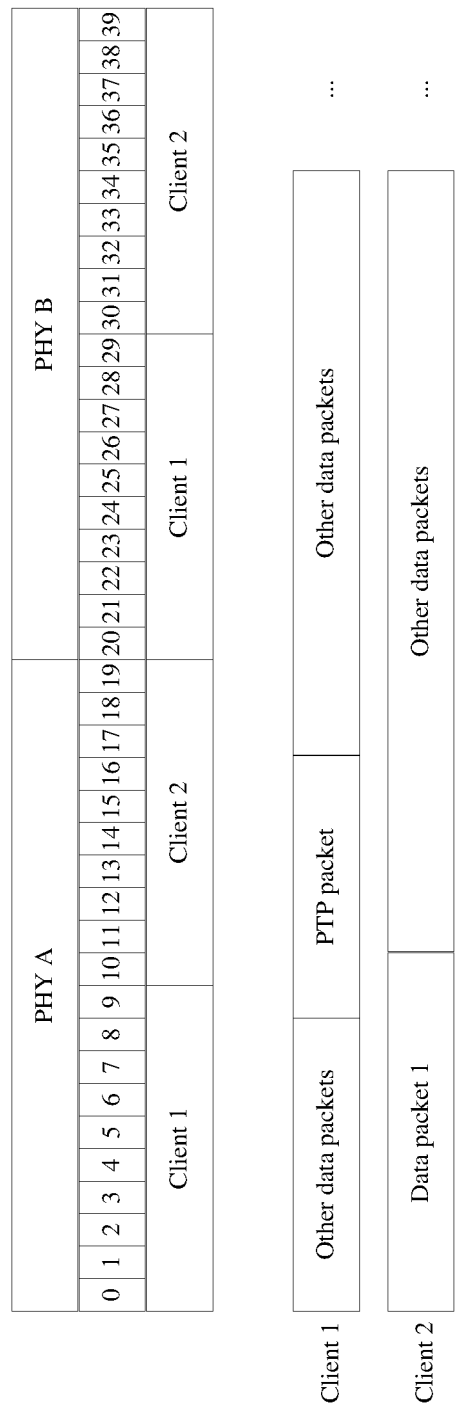
FIG. 4 is a schematic diagram of a method for transmitting a packet using two PHYs.

FIG. 4 is a schematic diagram of a method for transmitting a packet using two PHYs. As shown in FIG. 4, a PHY A and a PHY B are two physical links, and belong to a 2×100

GE FlexE bundle group. Based on the FlexE bundle group, there are two 100 Gbps clients, namely, a client 1 and a client 2.

A bandwidth of each PHY may be corresponding to 20 slots, and the FlexE bundle group corresponds to a total of 40 slots, numbered 0 to 39. A slot mapping manner of the two clients is shown in FIG. 4. The client 1 occupies the slots 0 to 9 and the slots 20 to 29, and the client 2 occupies the slots 10 to 19 and the slots 30 to 39. An Ethernet packet sent by the client 1 includes a Precision Time Protocol (PTP) packet, an Ethernet packet sent by the client 2 includes a data packet 1, and the data packet 1 is a non-PTP packet. A packet sending sequence of the client 1 and the client 2 is from left to right in FIG. 4, and a slot allocation sequence is sequentially allocating the slots in ascending order of the slot numbers.

Figure 5:
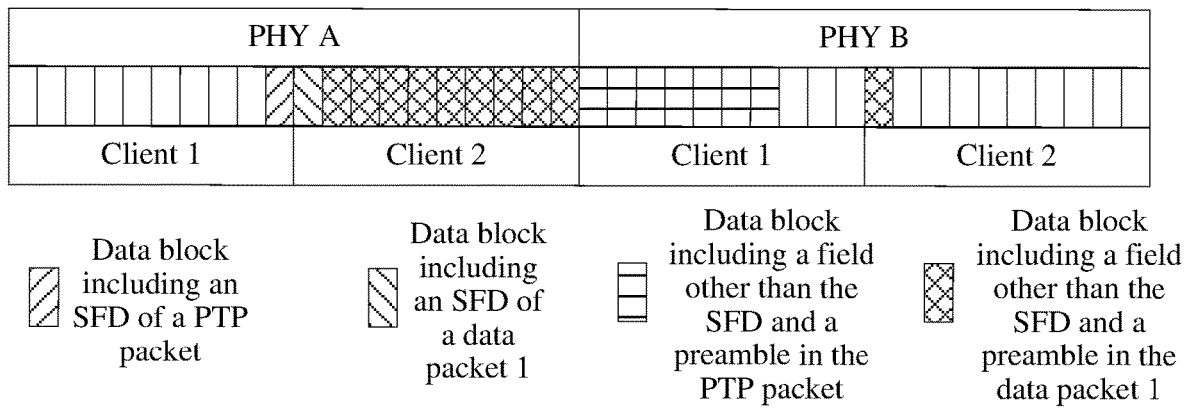
FIG. 5 is a schematic diagram of a result of mapping data packets of two clients to two PHYs.

After the slots are allocated, locations of the PTP packet and the data packet 1 in the two PHYs are shown in FIG. 5. The first data block of the PTP packet occupies the slot 9, and it can be learned from FIG. 3 that the data block is a data block corresponding to an SFD of the PTP packet. A data block corresponding to an SFD of the data packet 1 occupies the slot 10, and it can be learned that data blocks corresponding to two SFDs successively appear in the PHY A. For a sending apparatus, because a timestamp sampling module cannot identify the data block corresponding to the SFD of the PTP packet, the timestamp sampling module cannot time-stamp the data block. In addition, even if the sending apparatus identifies the data block corresponding to the SFD of the PTP packet and time-stamps the data block, because data blocks of the PTP packet arrive at a receiving apparatus in an out-of-order manner, the receiving apparatus cannot time-stamp the data block corresponding to the SFD of the PTP packet because the receiving apparatus cannot identify the data block.

FIG. 4 and FIG. 5 are merely simple examples. In actual application, there are more clients and more PHYs, and a scenario is more complex. Consequently, it is more difficult to identify a data block corresponding to an SFD of a PTP packet.

In addition to the foregoing difficulty, there is another difficulty of applying the clock synchronization technology in the legacy Ethernet to the FlexE. The TDM layer of the FlexE inserts or deletes an idle block when performing rate adaptation for a client, and then further needs to perform code block-to-slot and slot-to-physical lane mapping, this process changes a relative location of a PTP packet in a data stream, and a location of the PTP packet cannot be predicted logically, that is, the PTP packet is non-transparent in a transmission process.

A method for resolving the foregoing problem is that the sending apparatus indicates a data block corresponding to an SFD in a plurality of data blocks using out-of-band information such that a sending timestamp may be collected when the SFD arrives at the MDI, and the receiving apparatus performs timestamp sampling on the received data block to obtain a receipt timestamp of the data block corresponding to the SFD. In this method, because there is a skew between the plurality of PHYs, there is an error in a receipt timestamp determining method provided in this method.

Figure 6:
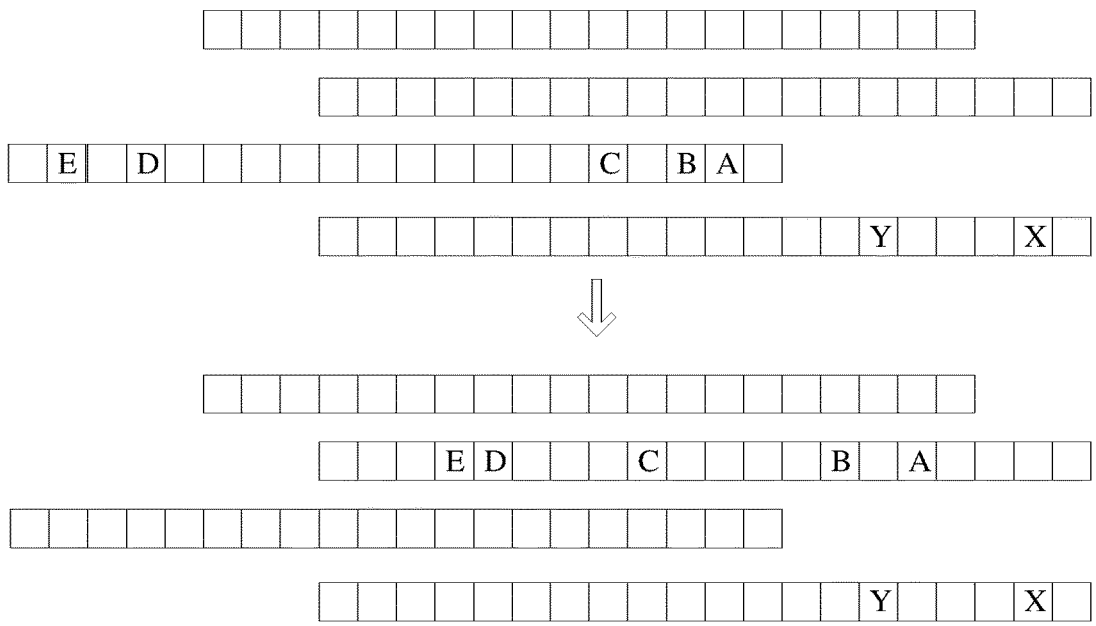
FIG. 6 is a schematic diagram of a skew relationship between a plurality of PHYs.

FIG. 6 is a schematic diagram of a skew that may occur between a plurality of PHYs.

In a TDM mechanism of the FlexE, a plurality of clients are mapped to a plurality of PHYs, and this mapping relationship is random, that is, a data block generated by any client may appear in any one or more PHYs. In a multi-PHY transmission scenario, although a skew relationship between two PHYs may be fixed (only a pure physical link latency is considered), because data blocks of one client may appear in different PHYs at different moments, for two clients, different skews may occur between data blocks of the two clients at different moments.

As shown in FIG. 6, after a mapping change (after FlexE calendar switch), a data block that should have been the last to arrive at the receiving apparatus is the first to arrive at a PHY of the receiving apparatus such that a skew between data blocks of different clients changes. The case shown in FIG. 6 is merely a simple example. There are various actual skew statuses, and it is also a common phenomenon that data blocks of one client are distributed in a plurality of PHYs.

For the receiving apparatus, if the foregoing skew phenomenon occurs between a plurality of received data blocks belonging to a same packet or a same group of packets (for example, a synchronization (sync) packet and a follow-up (follow_up) packet), a great error occurs in a receipt timestamp, and even a packet cannot be restored because the sending apparatus and the receiving apparatus can communicate using a packet only when a physical lane does not change.

The following describes in detail solutions that are to the foregoing problems and that are provided in this application.

Figure 7:
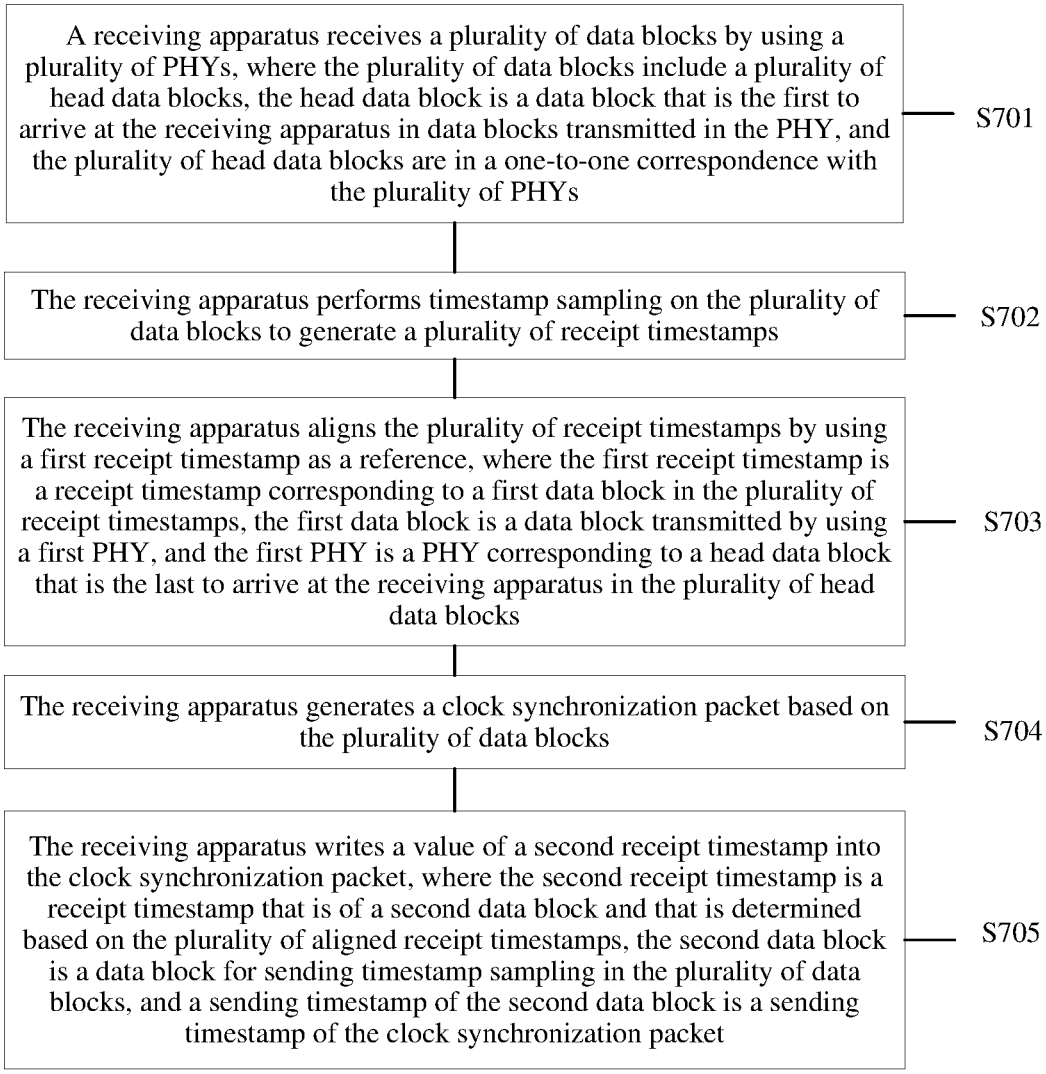
FIG. 7 is a schematic diagram of a clock synchronization method according to this application.

FIG. 7 shows a clock synchronization method according to this application. The method 700 includes the following steps.

S701. A receiving apparatus receives a plurality of data blocks using a plurality of PHYs, where the plurality of data blocks include a plurality of head data blocks, the head data block is a data block that is the first to arrive at the receiving apparatus in data blocks transmitted in a PHY, and the plurality of head data blocks are in a one-to-one correspondence with the plurality of PHYs.

S702. The receiving apparatus performs timestamp sampling on the plurality of data blocks to generate a plurality of receipt timestamps.

S703. The receiving apparatus aligns the plurality of receipt timestamps using a first receipt timestamp as a reference, where the first receipt timestamp is a receipt timestamp corresponding to a first data block in the plurality of receipt timestamps, the first data block is a data block transmitted using a first PHY, and the first PHY is a PHY corresponding to a head data block that is the last to arrive at the receiving apparatus in the plurality of head data blocks.

S704. The receiving apparatus generates a clock synchronization packet based on the plurality of data blocks.

S705. The receiving apparatus writes a value of a second receipt timestamp into the clock synchronization packet, where the second receipt timestamp is a receipt timestamp that is of a second data block and that is determined based on the plurality of aligned receipt timestamps, the second data block is a data block for sending timestamp sampling in the plurality of data blocks, and a sending timestamp of the second data block is a sending timestamp of the clock synchronization packet.

Because the receiving apparatus cannot identify which data block in the plurality of data blocks is the second data block, the receiving apparatus needs to collect a timestamp of data that is received each time, that is, generate a plurality of receipt timestamps, where the plurality of receipt timestamps exist as out-of-band information, and can be deleted only after the receiving apparatus identifies the second data block. It should be noted that timestamps of the PHYs are the same after alignment, and a timestamp of only one PHY may be retained, or timestamps of all PHYs may be retained.

In S703, a PHY that is the last to receive an overhead block in the plurality of PHYs is, for example, a PHY A, and the first data block is, for example, a data block that is the first to be received by the PHY A after the PHY A receives the overhead block (the first data block may alternatively be the overhead block, and a specific location of the first data block is not limited in this application). The receiving apparatus performs timestamp sampling on the first data block to obtain a first receipt timestamp, and a sampling point of the first receipt timestamp may be, for example, the first bit of the first data block.

Data received by the receiving apparatus in each receiving period may include a plurality of data blocks, that is, the plurality of data blocks share one receipt timestamp, and a data block whose receiving moment is recorded is referred to as a reference data block. In the method provided in this embodiment, a quantity of bits between each data block and the reference data block is recorded such that a receiving moment of the first data block can be calculated based on a correspondence between a bit and a time, that is, the receipt timestamp of the first data block is determined. In addition, even if a timestamp sampling point in the reference data block is deleted, in the method provided in this application, a location of the timestamp sampling point can be continuously tracked.

For example, the receiving apparatus receives eight data blocks in one receiving period, and performs timestamp sampling at a moment at which the first data block is received, where a quantity of bits included in each data block is 66. After the clock synchronization packet is restored, the receiving apparatus determines that the third data block in the eight data blocks is a data block corresponding to an SFD, and a quantity of bits between the third data block and the first data block is 132. Assuming that a time needed by the receiving apparatus to receive each bit is t, a receiving moment of the third data block is 132 t later than a receiving moment of the first data block such that a receiving moment of the first data block can be calculated.

It should be noted that the first data block may be the same as or different from the second data block. Correspondingly, when the first data block is the same as the second data block, the first receipt timestamp is the same as the second receipt timestamp, or when the first data block is different from the second data block, the first receipt timestamp is also different from the second timestamp.

Before aligning the plurality of receipt timestamps, the receiving apparatus first aligns a plurality of lanes included in each PHY. For a method for aligning the plurality of lanes, refer to the method in other approaches. For brevity, details are not described herein again.

In S704, the receiving apparatus may restore the clock synchronization packet based on an overhead multi-frame pair. For a specific method, refer to a packet restoration method in other approaches. For brevity, details are not described herein again.

After the clock synchronization packet is restored, the receiving apparatus can determine the second data block based on preset information in the packet, and write the receipt timestamp corresponding to the second data block into the clock synchronization packet as the receipt timestamp of the clock synchronization packet. Because the plurality of receipt timestamps including the second receipt timestamp have been aligned in S703, the second receipt timestamp is a receipt timestamp for which a skew has been cancelled such that a problem in other approaches that due to a skew, a great error occurs in the receipt timestamp, and even a packet cannot be restored is resolved.

It should be noted that when the second timestamp is compensated for in S705, in addition to a latency generated when receipt timestamps of the plurality of PHYs are aligned in S703, another latency further needs to be considered. For example, when the second data block is not a data block on which the receiving apparatus performs timestamp sampling, the receiving apparatus further needs to calculate, according to the foregoing method, a latency of the second data block relative to a data block for timestamp sampling, and compensate for the second timestamp.

Optionally, the aligning, by the receiving apparatus, the plurality of receipt timestamps using a first receipt timestamp as a reference includes the following step.

S706. The receiving apparatus adjusts values of the plurality of receipt timestamps in duration of a receiving period using the first receipt timestamp as a reference.

Figure 8:
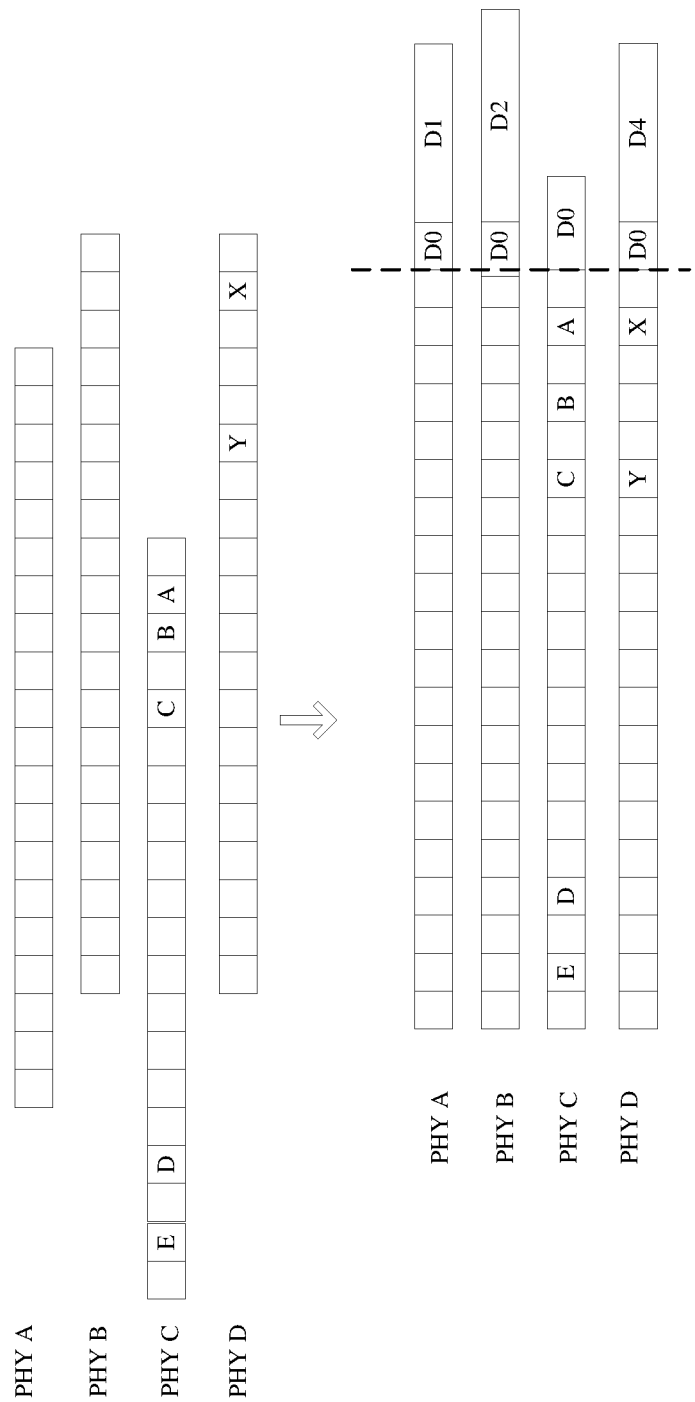
FIG. 8 is a schematic diagram of a receipt timestamp alignment method according to this application.

In a process of aligning the plurality of receipt timestamps, the receiving apparatus may adjust the plurality of receipt timestamps in the duration of the receiving period. As shown in FIG. 8, a PHY C is a PHY that is the last to receive an overhead frame in four PHYs, latencies of a PHY A, a PHY B, and a PHY D relative to the PHY C are respectively D1, D2, and D4, D0 is a buffer delay of each PHY, the buffer delay is used to compensate for D1, D2, or D4 such that total duration of D1, D2, or D4 plus the buffer delay is equal to an integer multiple of the receiving period. For example, the duration of the receiving period is T, D1 is equal to 3.5T, D2 is equal to 4.6T, and D4 is equal to 4.7T. Then, a value of D0 of the PHY A is 0.5T, a value of D0 of the PHY B is 0.4T, a value of D0 of the PHY C is T, and a value of D0 of the PHY D is 0.3T such that the receipt timestamps of the plurality of PHYs are aligned.

In an optional example, the second receipt timestamp is a timestamp of the PHY C, and then T also belongs to a latency generated when the second timestamp is aligned.

It should be understood that the foregoing method is merely an example description. The receiving apparatus may further align the timestamps of the plurality of PHYs in other duration. For example, the receiving apparatus may further align the timestamps of the plurality of PHYs in duration needed for receiving one bit.

Optionally, the duration of the receiving period is equal to duration needed by the receiving apparatus to receive X-bit data, and X is a value of a data bus bit width of the receiving apparatus or a smaller value in values of data buffer bit widths of a serial-to-parallel conversion port of the receiving apparatus.

A smaller bit width indicates a shorter receiving period, a higher receipt timestamp sampling frequency, and a smaller time granularity of adjusting the plurality of timestamps, to help improve precision of the finally determined receipt timestamp of the clock synchronization packet.

Optionally, before the generating, by the receiving apparatus, a clock synchronization packet based on the plurality of data blocks, the method 700 further includes the following step.

S707. The receiving apparatus deletes a receipt timestamp other than the receipt timestamp corresponding to the first PHY.

The receipt timestamps of the PHYs are the same after alignment processing. Therefore, a receipt timestamp of only one PHY may be retained, to reduce occupation of storage space.

Optionally, the second data block is a data block corresponding to an SFD of the clock synchronization packet.

The SFD is a field that is the first to be sent and the first to be received in the clock synchronization packet, and in a legacy Ethernet, timestamp sampling is performed using the SFD as a reference point. Therefore, compatibility of the clock synchronization method in the FlexE can be improved using a bit that is the first to be received in the receiving period as a timestamp sampling point.

Optionally, the clock synchronization packet is carried in a client payload of the FlexE.

In the method provided in this embodiment, the clock synchronization packet is received using the client payload of the FlexE, and this is the same as a clock synchronization packet receiving method in the legacy Ethernet such that compatibility of the clock synchronization method in the FlexE can be improved. In addition, in a FlexE-FlexE direction connection scenario, a sending timestamp is directly transmitted to a FlexE demux. Compared with a method for sending a timestamp using an overhead frame in the other approaches, in this embodiment, the sending apparatus does not need to extract a sending timestamp from a client payload and add the sending timestamp to an overhead frame, and the receiving apparatus does not need to extract the sending timestamp from the overhead frame and add the sending timestamp to the client payload, to reduce logic complexity.

The foregoing describes in detail an example of a clock synchronization packet sending and receiving method provided in this application. It may be understood that to implement the foregoing functions, the sending apparatus and the receiving apparatus include corresponding hardware structures and/or software modules for executing the functions. A person of ordinary skill in the art should easily be aware that units and algorithm steps in the examples described with reference to the embodiments disclosed in this specification may be implemented by hardware or a combination of hardware and computer software in this application. Whether a function is executed by hardware or hardware driven by computer software depends on particular applications and design constraints of the technical solutions. A person skilled in the art may use different methods to implement the described functions for the particular applications, but it should not be considered that the implementation goes beyond the scope of this application.

In this application, the sending apparatus and the receiving apparatus may be divided into functional units based on the foregoing method examples. For example, each function unit may be obtained through division based on a corresponding function, or two or more functions may be integrated into one processing unit. The integrated unit may be implemented in a form of hardware, or may be implemented in a form of a software functional unit. It should be noted that in this application, unit division is schematic and is merely a logical function division. In actual implementation, another division manner may be used.

Figure 9:
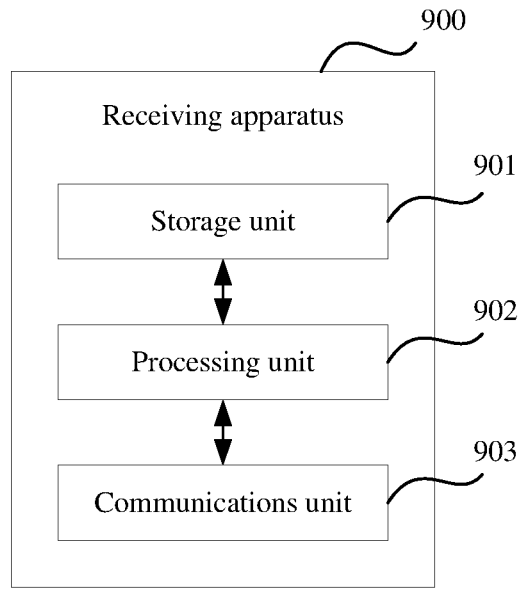
FIG. 9 is a schematic diagram of a possible receiving apparatus according to this application.

When an integrated unit is used, FIG. 9 is a possible schematic structural diagram of the receiving apparatus in the foregoing embodiment. A receiving apparatus 900 includes a processing unit 902 and a communications unit 903. The processing unit 902 is configured to control and manage actions of the receiving apparatus 900. For example, the processing unit 902 is configured to support the receiving apparatus 900 in performing S703 and/or is configured for another process of the technology described in this specification. The communications unit 903 is configured to support communication between the receiving apparatus 900 and a sending apparatus and communication between modules or units in the receiving apparatus 900. The receiving apparatus 900 may further include a storage unit 901 configured to store program code and data of the receiving apparatus 900.

The processing unit 902 controls the communications unit 903 to perform the following operation receiving a plurality of data blocks using a plurality of PHYs, where the plurality of data blocks include a plurality of head data blocks, the head data block is a data block that is the first to arrive at the receiving apparatus in data blocks transmitted in the PHY, and the plurality of head data blocks are in a one-to-one correspondence with the plurality of PHYs.

The processing unit 902 performs the following operations performing timestamp sampling on the plurality of data blocks received by the communications unit, to generate a plurality of receipt timestamps, aligning the plurality of receipt timestamps using a first receipt timestamp as a reference, where the first receipt timestamp is a receipt timestamp corresponding to a first data block in the plurality of receipt timestamps, the first data block is a data block transmitted using a first PHY, and the first PHY is a PHY corresponding to a head data block that is the last to arrive at the receiving apparatus in the plurality of head data blocks, generating a clock synchronization packet based on the plurality of data blocks, and writing a value of a second receipt timestamp into the clock synchronization packet, where the second receipt timestamp is a receipt timestamp that is of a second data block and that is determined based on the plurality of aligned receipt timestamps, the second data block is a data block for sending timestamp sampling in the plurality of data blocks, and a sending timestamp of the second data block is a sending timestamp of the clock synchronization packet.

The processing unit 902 may be a processor or a controller, for example, may be a central processing unit (CPU), a general-purpose processor, a digital signal processor (DSP), an application-specific integrated circuit (ASIC), a field-programmable gate array (FPGA), or another programmable logical device, a transistor logical device, a hardware component, or a combination thereof. The processor may implement or execute various example logical blocks, modules, and circuits described with reference to content disclosed in this application. Alternatively, the processor may be a combination implementing a computing function, for example, a combination of one or more microprocessors, or a combination of the DSP and a microprocessor. The communications unit 903 may be a communications interface or the like. The storage unit 901 may be a memory.

Figure 10:
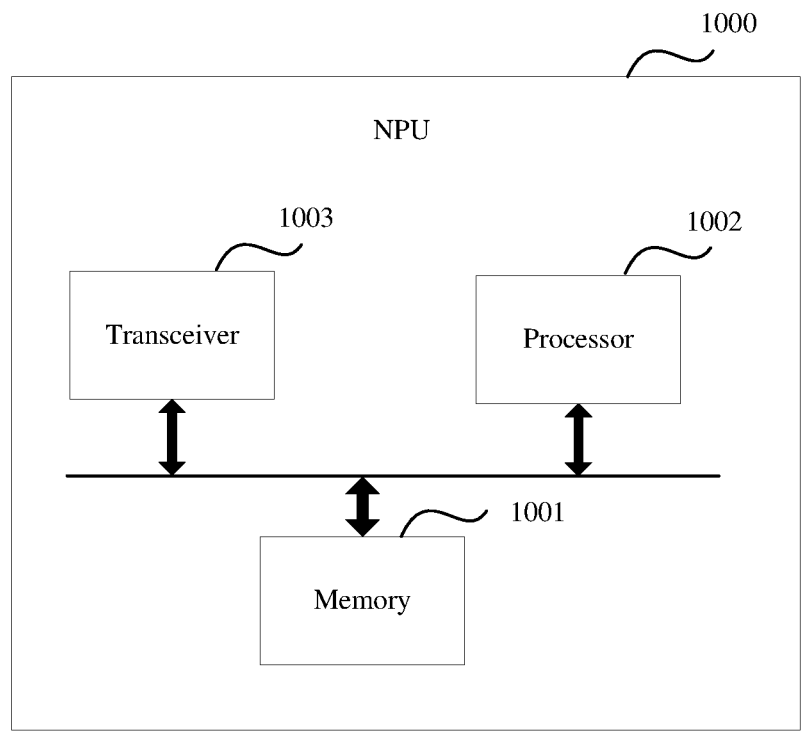
FIG. 10 is a schematic diagram of another possible receiving apparatus according to this application.

When the processing unit 902 is a processor, the communications unit 903 is a transceiver, and the storage unit 901 is a memory, the receiving apparatus in this application may be an NPU 1000 shown in FIG. 10.

Referring to FIG. 10, the NPU 1000 includes a processor 1002, a communications interface 1003, and a memory 1001. The communications interface 1003, the processor 1002, and the memory 1001 may communicate with each other using an internal connection path, to transmit a control signal and/or a data signal.

It may be clearly understood by a person skilled in the art that for easy and brief description, for a specific working process of the foregoing apparatus and units, refer to the corresponding process in the foregoing method embodiment, and details are not described herein again.

The receiving apparatus 900 or the NPU 1000 provided in this application continuously and periodically time-stamps (that is, performs timestamp sampling on) data blocks received by each PHY, to generate a plurality of receipt timestamps, where the plurality of receipt timestamps include a timestamp corresponding to a data block (that is, a second data block) for sending timestamp sampling in the plurality of data blocks, and aligns the timestamps. In an embodiment, the receiving apparatus 900 or the NPU 1000 waits for a PHY (that is, a first PHY) that is the last to receive an overhead block in the plurality of PHYs, and adjusts, using a timestamp (that is, a first timestamp) of a data block that is the first to be received by the first PHY after the first PHY receives the overhead block as a reference, timestamps of data blocks received by the other PHY in the plurality of PHYs, and uses the first timestamp as a common timestamp of data blocks that are the first to be received by all PHYs after the PHYs receive overhead blocks, to align times at which the plurality of data blocks arrive at the receiving apparatus. The plurality of data blocks include the data blocks corresponding to the clock synchronization packet. After the clock synchronization packet is restored, the receipt timestamp corresponding to the second data block can be determined. The timestamp corrects a skew that occurs between a plurality of data blocks from a same FlexE client after the plurality of data blocks arrive at the receiving apparatus.

The sending apparatus or the receiving apparatus in the apparatus embodiment is completely corresponding to the sending apparatus or the receiving apparatus in the method embodiment. A corresponding module performs a corresponding step, for example, a sending module or a transmitter performs a sending step in the method embodiment, a receiving module or a receiver performs a receiving step in the method embodiment, and steps other than the sending step and the receiving step may be performed by a processing module or a processor. For a function of a specific module, refer to the corresponding method embodiment. Details are not described again.

In the embodiments of this application, sequence numbers of the foregoing processes do not mean an execution sequence. The execution sequence of the processes should be determined based on functions and internal logic of the processes, and should not be construed as any limitation on the implementation process of this application.

In addition, the term "and/or" in this specification is only an association relationship for describing associated objects and represents that three relationships may exist. For example, A and/or B may represent the following three cases. Only A exists, both A and B exist, and only B exists. In addition, the character "/" in this specification generally indicates an "or" relationship between the associated objects.

Method or algorithm steps described with reference to the content disclosed in this application may be implemented by hardware, or may be implemented by a processor executing a software instruction. The software instruction may include a corresponding software module. The software module may be stored in a random-access memory (RAM), a flash memory, a read-only memory (ROM), an erasable programmable read only memory (EPROM), an electrically erasable programmable read only memory (EEPROM), a register, a hard disk, a removable hard disk, a compact disc read-only memory (CD-ROM), or any other form of storage medium well-known in the art. For example, a storage medium is coupled to a processor such that the processor can read information from the storage medium or write information into the storage medium. Certainly, the storage medium may be a component of the processor. The processor and the storage medium may be located in the ASIC. In addition, the ASIC may be located in a terminal device. Certainly, the processor and the storage medium may exist in the receiving apparatus as discrete components.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer program instruction is loaded and executed on a computer, the procedure or functions according to this application are all or partially generated. The computer may be a general-purpose computer, a dedicated computer, a computer network, or another programmable apparatus. The computer instruction may be stored in a computer readable storage medium, or may be transmitted using the computer readable storage medium. The computer instruction may be transmitted from one website, computer, server, or data center to another website, computer, server, or data center in a wired (for example, a coaxial cable, a fiber, or a digital subscriber line (DSL)) or wireless (for example, infrared, wireless, or microwave) manner. The computer readable storage medium may be any available medium accessible by a computer, or a data storage device, such as a server or a data center, integrating one or more usable media. The available medium may be a magnetic medium (for example, a floppy disk, a hard disk, or a magnetic tape), an optical medium (for example, a digital versatile disc (DVD), a semiconductor medium (for example, a solid-state drive (SSD)), or the like.

The objectives, technical solutions, and beneficial effects of this application are further described in detail in the foregoing specific implementations. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

What is claimed is:

1. A clock synchronization method in Flexible Ethernet (FlexE), implemented by a receiving apparatus, wherein the clock synchronization method comprises:
    receiving a plurality of data blocks using a plurality of physical layer modules (PHYs);
    deskewing the data blocks to produce deskewed data blocks;
    recording receipt timestamps of the data blocks; and
    generating, based on the deskewed data blocks, a clock synchronization packet,
    wherein the clock synchronization packet comprises a first receipt timestamp of the receipt timestamps and corresponding to a first data block of the data blocks.

2. The clock synchronization method of claim 1, wherein a first sending timestamp of the first data block is a second sending timestamp comprised in the clock synchronization packet.

3. The clock synchronization method of claim 1, wherein the first data block is associated with a start frame delimiter (SFD) of the clock synchronization packet.

4. The clock synchronization method of claim 1, wherein the first data block corresponds to a start frame delimiter (SFD) of the clock synchronization packet.

5. The clock synchronization method of claim 1, further comprising:
    performing timestamp sampling on the data blocks to generate the of receipt timestamps, wherein the data blocks comprise a plurality of head data blocks, wherein the head data blocks are received at the receiving apparatus first from the data blocks, and wherein the head data blocks are in a one-to-one correspondence with the PHYs; and deskewing the receipt timestamps using the first receipt timestamp as a reference, wherein the first receipt timestamp is of a second data block in the data blocks, and wherein the second data block is received using a first PHY of the PHYs.

6. The clock synchronization method of claim 5, further comprising adjusting values of the receipt timestamps during a receiving period using the first receipt timestamp as the reference, wherein the receiving period is for performing the timestamp sampling on the data blocks.

7. The clock synchronization method of claim 5, wherein the first PHY corresponds to a last head data block in the data blocks.

8. The clock synchronization method of claim 6, wherein the receiving apparatus comprises a data bus, wherein the data bus comprises a data bus width value of X, and wherein the receiving period is equal to a duration needed by the receiving apparatus to receive X bits of data.

9. The clock synchronization method of claim 1, wherein before generating the clock synchronization packet, the clock synchronization method further comprises deleting one of the receipt timestamps other than the first receipt timestamp.

10. The clock synchronization method of claim 1, further comprising writing a value of a second receipt timestamp into the clock synchronization packet, wherein the second receipt timestamp is of the first a first data block and is based on the receipt timestamps.

11. A clock synchronization apparatus in Flexible a flexible Ethernet (FlexE), comprising:
a processor; and
a memory coupled to the processor and configured to store instructions that, when executed by the processor, cause the clock synchronization apparatus to:
receive a plurality of data blocks using a plurality of physical layer modules (PHYs);
deskew the data blocks to produce deskewed data blocks;
record receipt timestamps of the data blocks; and
generate, based on the deskewed data blocks, a clock synchronization packet,
wherein the clock synchronization packet comprises a first receipt timestamp of the receipt timestamps corresponding to a first data block of the data blocks.

12. The clock synchronization apparatus of claim 11, wherein a first sending timestamp of the first data block is a second sending timestamp comprised in the clock synchronization packet.

13. The clock synchronization apparatus of claim 11, wherein the first data block is associated with a start frame delimiter (SFD) of the clock synchronization packet.

14. The clock synchronization apparatus of claim 11, wherein the first data block corresponds to a start frame delimiter (SFD) of the clock synchronization packet.

15. The clock synchronization apparatus of claim 11, wherein the instructions further cause the clock synchronization apparatus to:
perform timestamp sampling on the data blocks to generate the receipt timestamps, wherein the data blocks comprise a plurality of head data blocks, wherein the head data blocks are received at the clock synchronization apparatus first from the data blocks, and wherein the head data blocks are in a one-to-one correspondence with the PHYs; and
deskew the receipt timestamps using the first receipt timestamp as a reference,
wherein the first receipt timestamp is of a second data block in the data blocks, and
wherein the first data block is received using a first PHY of the PHYs.

16. A computer program product comprising instructions stored on a non-transitory computer-readable medium that, when executed by a processor, cause a clock synchronization apparatus to:
receive a plurality of data blocks using a plurality of physical layer modules (PHYs);
deskew the data blocks to produce deskewed data blocks;
record receipt timestamps of the data blocks; and
generate, based on the deskewed data blocks, a clock synchronization packet,
wherein the clock synchronization packet comprises a first receipt timestamp of the receipt timestamps corresponding to a first data block of the data blocks.

17. The computer program product of claim 16, wherein a first sending timestamp of the first data block is a second sending timestamp comprised in the clock synchronization packet.

18. The computer program product of claim 16, wherein the first data block is associated with a start frame delimiter (SFD) of the clock synchronization packet.

19. The computer program product of claim 16, wherein the instructions, when executed by the processor, further cause the clock synchronization apparatus to:
perform timestamp sampling on the data blocks to generate the receipt timestamps, wherein the data blocks comprise a plurality of head data blocks, wherein the head data blocks are received at the clock synchronization apparatus, and wherein the head data blocks are in a one-to-one correspondence with the PHYs; and
deskew the receipt timestamps using the first receipt timestamp as a reference,
wherein the first receipt timestamp is of a second data block in the data blocks, and
wherein the first data block is received using a first PHY of the PHYs.

20. The computer program product of claim 19, wherein the instructions, when executed by the processor, further cause the clock synchronization apparatus to adjust values of the receipt timestamps during a receiving period using the first receipt timestamp as the reference, and wherein the receiving period is for performing the timestamp sampling on the data blocks.

* * * * *